United States Patent [19]
Budecker et al.

[11] Patent Number: 5,078,458
[45] Date of Patent: Jan. 7, 1992

[54] ANTI LOCK BRAKE SYSTEM

[75] Inventors: Ludwig Budecker, Frankfurt am Main; Erhard Beck, Darmstadt; Anton David, Goetzenhain; Gottfried Dehio, Frankfurt am Main, all of Fed. Rep. of Germany

[73] Assignee: Alfred Teves GmbH, Frankfurt am Main, Fed. Rep. of Germany

[21] Appl. No.: 530,493

[22] Filed: May 29, 1990

Related U.S. Application Data

[63] Continuation of Ser. No. 277,289, Nov. 29, 1988, abandoned.

[30] Foreign Application Priority Data

Nov. 30, 1987 [DE] Fed. Rep. of Germany ....... 3740516

[51] Int. Cl.⁵ .................................................. B60T 8/32
[52] U.S. Cl. ................................. 303/116 PC; 303/10
[58] Field of Search ............... 303/10, 113, 116, 115, 303/119, 116 R, 116 PC

[56] References Cited

U.S. PATENT DOCUMENTS

| | | | |
|---|---|---|---|
| 4,421,361 | 12/1983 | Arikawa et al. | 303/116 X |
| 4,652,061 | 3/1987 | Nishimura et al. | 303/116 |
| 4,708,406 | 11/1987 | Takagi et al. | 303/115 |
| 4,726,630 | 2/1988 | Krohn et al. | 303/116 X |
| 4,730,879 | 3/1988 | Adachi et al. | 303/116 |
| 4,779,935 | 10/1988 | Kuwana et al. | 303/116 |
| 4,892,363 | 1/1990 | Burgdorf | 303/116 |
| 4,929,037 | 5/1990 | Farr | 303/116 |

FOREIGN PATENT DOCUMENTS

| | | |
|---|---|---|
| 2952221 | 7/1981 | Fed. Rep. of Germany. |
| 3601914 | 7/1987 | Fed. Rep. of Germany. |
| 3704623 | 10/1987 | Fed. Rep. of Germany. |
| 1560886 | 2/1980 | United Kingdom. |
| 2065807 | 7/1981 | United Kingdom ............... 303/116 |
| 2069639 | 8/1981 | United Kingdom. |
| 2191554 | 12/1987 | United Kingdom. |
| 2199385 | 7/1988 | United Kingdom. |

*Primary Examiner*—Matthew C. Graham
*Attorney, Agent, or Firm*—Robert P. Seitter; J. Gordon Lewis

[57] ABSTRACT

Disclosed is an anti-lock brake system of the type wherein the pressure applied on the wheel brakes can be decreased by discharging pressure fluid by way of a return line wherein the brake system includes a pump whose suction chamber communicates through a suction line with a reservoir and a return line is connected to the suction chamber.

2 Claims, 2 Drawing Sheets

ANTI LOCK BRAKE SYSTEM

This application is a continuation of application Ser. No. 277,289, filed Nov. 29, 1988, now abandoned.

BACKGROUND OF THE INVENTION

The present invention relates to an anti-lock brake system of the type wherein the pressure applied to the wheel brakes can be decreased by discharge of the pressure fluid by way of a return line, and including a pump whose suction chamber communicates through a suction line with a reservoir.

A brake system of this type is known from German published patent application P 36 01 914. That known brake system provides for the return line to connect to the outlet valves, on the one hand, and to the reservoir, on the other hand. The total capacity of the pump is required in this event and great pump efficiency is of utmost importance. In particular in piston-type pumps with suction valves and pressure valves, the pump's suction efficiency at very low temperatures, that is high viscosity of the fluid, has been a problem.

SUMMARY OF THE INVENTION

Therefore, it is an object of the present invention to optimize in a brake system of this type the pump's suction efficiency with the least expenditure possible. This object is achieved according to the present invention in that the return line is connected to the suction chamber. In this way, the pressure-reduction pulse created by the wheel brake, by which anti-lock control is always initiated, is made use of to 'charge' the pump.

This pressure-reduction pulse is used in a particularly expedient fashion for charging the pump in that the return line and the suction line form an acute angle in the area of the suction chamber so that the end of the return line connected with the suction chamber points in the direction of the working chamber of the pump. In a preferred embodiment of this invention, it is provided that the return line has a reduced cross-sectional area or waist in the area of its connection to the suction chamber. This feature provides for charging of the pump in a particularly favorable manner according to the "jet pump principle". According to one construction the cross-sectional waist is formed by an injector nozzle of such configuration that the return line is narrowed in its cross-section in the suction chamber.

Charging of the pump can be optimized in that the pump is designed as a piston-type pump, and in that the pressure-reduction pulse in the return line is synchronized with the position of the working piston in such a manner that the pressure-reduction pulse takes place when the working piston performs a suction stroke. According to one embodiment of this invention, it is provided that the connection of the return line to the suction chamber is integrated into the pump housing.

In order to always assure that there is an energy supply to the brake system, it is particularly expedient that there be a dual-circuit and that each circuit has a separate return line and a separate suction line.

BRIEF DESCRIPTION OF THE DRAWING

Further advantageous features as well as the function of the inventive brake system will be understood from the following Detailed Description of a Preferred Embodiment and from the drawings in which.

DETAILED DESCRIPTION OF A PREFERRED EMBODIMENT

Figure 1:
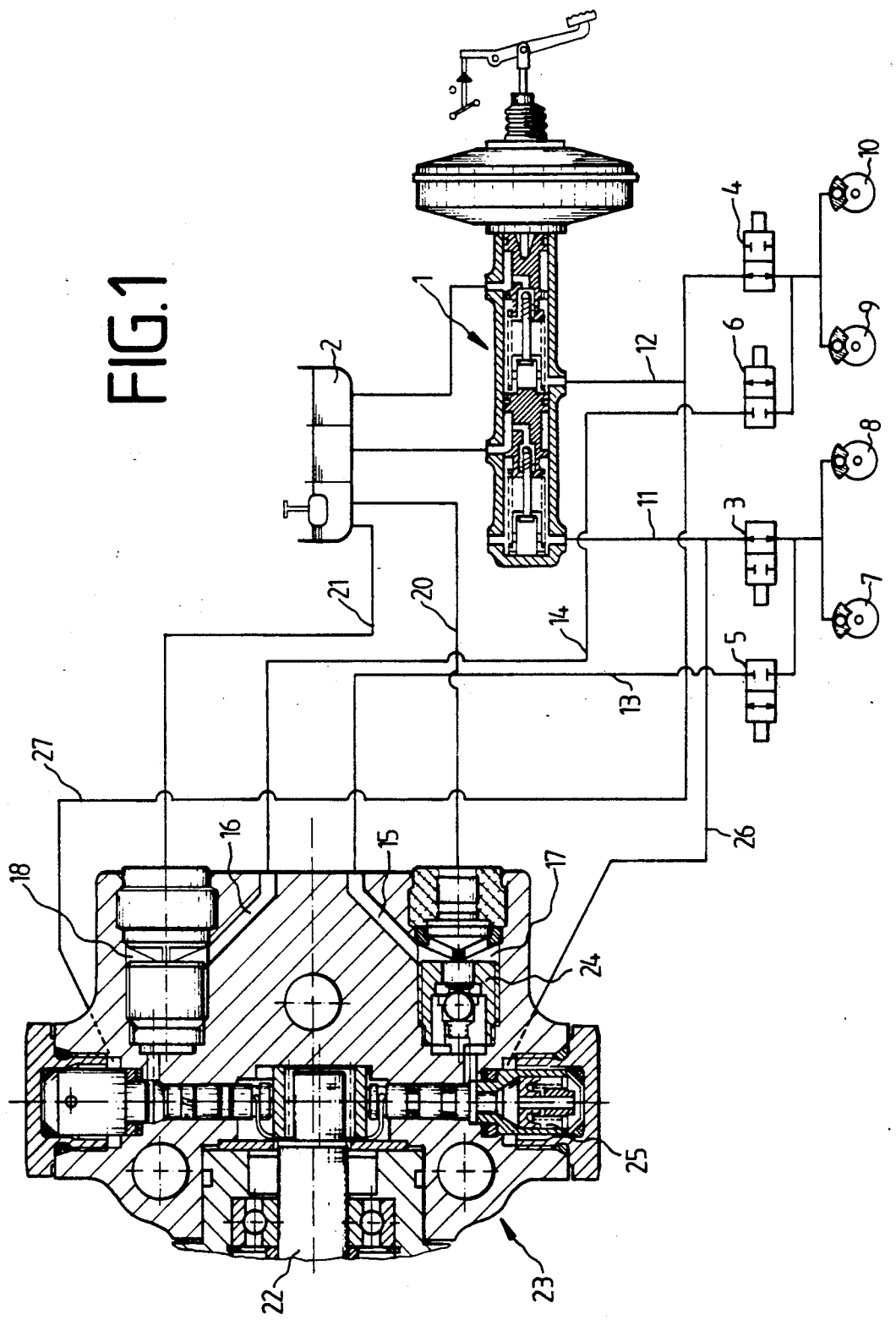
FIG. 1 is a partial cross-sectional and schematic diagram of a preferred embodiment of the inventive anti-lock brake system.

The anti-lock brake system illustrated in FIG. 1 comprises a tandem master cylinder 1 with a vacuum brake power booster, with the tandem master cylinder 1 communicating with a reservoir 2, on the one hand, while, on the other hand, it is connected to wheel brakes 7, 8 and/or 9, 10 by way of brake lines 11 and/or 12 and through inlet valves 3 and/or 4. In this arrangement, for instance, the wheel brakes 7, 8 connect to the front axle, while the wheel brakes 9, 10 are connected to the rear axle. The inlet valves 3, 4 are designed as solenoid valves which are open in their de-energized state.

From the wheel brakes 7, 8, 9, 10, a connection leads to the outlet solenoid valves 5, 6 which are closed in their de-energized state. From the outlet of the outlet valves 5, 6 there is a return line 13 and/or 14 which are each connected with an associated suction chamber 17, 18 through a channel 15 and/or 16.

The suction chambers 17, 18 communicate through an associated suction line 20, 21 with the reservoir 2. A pump 23 which is designed as a dual-circuit radial piston pump, includes working pistons which are moved outwardly by the eccentric portion of a drive shaft 22, while a coupling ring resets the respectively opposed working piston to the inside and thus performs the suction stroke. Interposed between the working chambers of the pump and the suction lines 20, 21 is a suction valve 24, while a compression valve 25 is provided between the pressure lines 26, 27 and the respective working chambers.

The pressure lines 26, 27 are connected to the associated brake lines 11 and/or 12 between the corresponding inlet valves 3 and/or 4 and the tandem master cylinder 1. The wheel sensors provided at each wheel as well as the electric motor for driving the pump 23 and the control electronics are not illustrated for the sake of clarity.

During a braking operation, the wheel brakes 7, 8, 9, 10 are acted upon through the brake lines 11, 12 and the open inlet valves 3, 4 with a pressure proportional to the pedal force which is generated in the tandem master cylinder 1. Pump 23 is not switched at this time and the outlet valves 5, 6 are closed.

When during a braking operation an imminent locked condition of a vehicle wheel is detected by the sensors and the control electronics, the appropriate outlet valve 5 or 6 will be opened instantaneously at least for a short time in order to reduce the braking pressure on the wheel brake associated with the imminently locking wheel. Simultaneously, the pump 23 is switched on. Further pressure modulation of the braking pressure is now effected by actuating the inlet valves 3, 4 and outlet valves 5, 6 corresponding to the regulating characteristics of the control electronics. The pressure fluid required for these regulating operations is supplied by the pump 23 which will be de-activated when the anti-lock control action is terminated.

Due to the fact that an anti-lock control phase is always initiated by opening of an outlet valve 5 or 6 and that the pump 23 starts to operate simultaneously, a predefined quantity of pressure fluid is introduced through a return line 13 or 14 into the corresponding suction chamber 17 and/or 18 of the respective pump circuit synchronously with each pump start. This fluid flow also acts, according to the principle of an injector pump, upon the pressure fluid in the connected suction line 20 or 21.

In order to further improve the suction conditions, it is preferable to synchronize the pressure-reduction pulses outputted by the outlet valves, 5, 6 with the position of the corresponding working piston of the pump 23. This can, for example, be controlled by sensors which record the position of the drive shaft 22.

Figure 2:
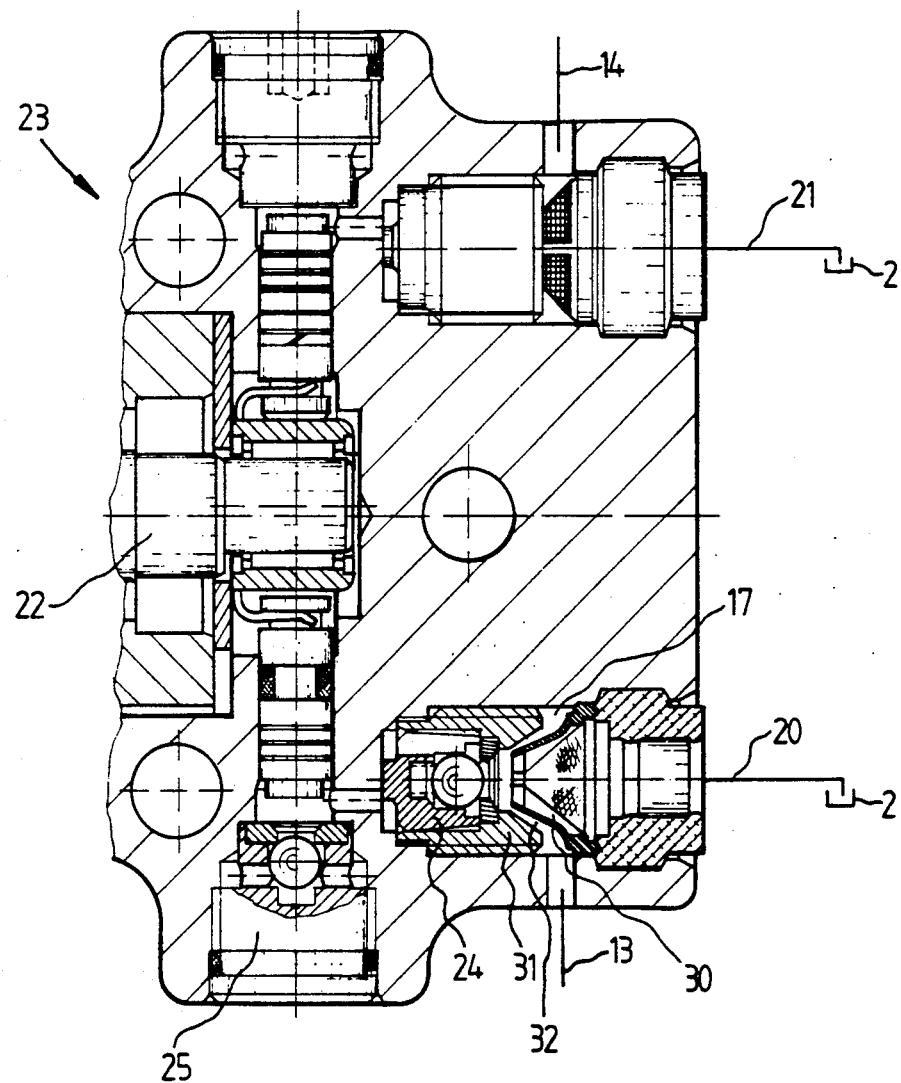
FIG. 2 is an alternative embodiment of a pump used in the invention.

FIG. 2 shows another embodiment of the pump of the invention. The pump 23 includes a specially designed suction chamber. Elements corresponding to each other have been assigned the same reference numerals used in the description of FIG. 1.

Projecting from the suction line 20 into the suction chamber 17 of the pump 23 is a filter 30 designed as an injector nozzle. This conical filter 30 extends with its tapered end partly into a conically designed recess which is designed on the end surface of the housing 31 of the suction valve 24. This recess and the filter 30 together form an annular flow duct 32 for the pressure fluid flowing in through the return line 13. The cross-section of the flow duct 30 narrows toward the suction valve 24 so that the pressure fluid flowing through the return line 13 is caused to assume a higher flow velocity. As a result, pressure below atmospheric pressure is generated in the interior of the filter 30 which causes the suction of pressure fluid out of the reservoir 2.

What is claimed is:

1. A vehicle anti-lock brake system, of the type including one or more wheel brakes and corresponding wheel cylinders therefore, a brake pedal operated master cylinder having a hydraulic connection to said wheel cylinders for operating said wheel brakes by pressurized hydraulic fluid and a reservoir containing hydraulic fluid under atmospheric pressure, and said reservoir in communication with said master cylinder to supply hydraulic fluid to said master cylinder pressurized hydraulic fluid applied to said wheel cylinders by discharge of said pressurized hydraulic fluid including one or more outlet valves in a return line, a controllably activated pump, said pump having a working chamber, a suction chamber, and an output pressure chamber, means hydraulically connecting said output pressure chamber to one or more of said wheel cylinders including one or more inlet valves and connecting pressure lines; a suction line communicating with said reservoir and flow passage means connecting said return line to said suction chamber, to receive discharge from said wheel cylinder, said flow passage means including a reducing area region causing a sub-atmospheric pressure to develop in said discharge flow, and means placing said suction line in communication with said suction chamber via said sub-atmospheric pressure region of said flow passage means, whereby hydraulic fluid flow from said return line into said suction chamber causes suction of hydraulic fluid out of said reservoir and into said suction chamber to precharge said suction chamber with hydraulic fluid preparatory to re-pressurization of said one or more wheel cylinders.

2. The antilock brake system according to claim 1, wherein said flow passage means is comprised of a conical chamber, and a conical filter disposed within said conical chamber with a converging annular space between the outside of said conical filter defining said sub-atmospheric pressure region, said suction line connected to the inside of said conical filter to establish communication with said sub-atmospheric pressure region of said flow passage means.

* * * * *